(12) United States Patent
De Jong

(10) Patent No.: US 9,162,831 B2
(45) Date of Patent: Oct. 20, 2015

(54) DEVICE FOR BLOCKING A VEHICLE, METHOD THEREFOR AND LOADING-UNLOADING STATION PROVIDED THEREWITH

(71) Applicant: Stertil B.V., Kootstertille (NL)

(72) Inventor: Jurjen Jan De Jong, Buitenpost (NL)

(73) Assignee: Stertil B.V., Kootstertille (NL)

( * ) Notice: Subject to any disclaimer, the term of this patent is extended or adjusted under 35 U.S.C. 154(b) by 49 days.

(21) Appl. No.: 13/922,464

(22) Filed: Jun. 20, 2013

(65) Prior Publication Data
US 2013/0341130 A1 Dec. 26, 2013

(30) Foreign Application Priority Data
Jun. 21, 2012 (NL) .................................. 2009050

(51) Int. Cl.
*B65G 69/00* (2006.01)

(52) U.S. Cl.
CPC .................................... *B65G 69/005* (2013.01)

(58) Field of Classification Search
CPC .......... B65G 69/005; B60T 3/00; B60P 3/077
USPC ............................ 188/32, 36, 5; 414/401, 396
See application file for complete search history.

(56) References Cited

U.S. PATENT DOCUMENTS

| 5,762,459 | A  | * | 6/1998  | Springer et al. | 414/401 |
| RE37,570  | E  | * | 3/2002  | Springer et al. | 414/401 |
| 6,368,043 | B1 |   | 4/2002  | Leum et al.     |         |
| 6,589,003 | B2 | * | 7/2003  | Berends         | 414/401 |
| 6,773,221 | B2 | * | 8/2004  | Belongia et al. | 414/401 |
| 8,590,673 | B2 | * | 11/2013 | Andersen et al. | 188/32  |
| 2011/0233006 | A1 |   | 9/2011 | De Jong        |         |

FOREIGN PATENT DOCUMENTS

| EP | 0684915     |    | 7/1995  |
| EP | 1120371  B1 |    | 10/2005 |
| EP | 1764275  A1 |    | 3/2007  |
| EP | 2236445  A1 |    | 10/2010 |
| EP | 2371745  A1 |    | 10/2011 |
| EP | 2380833  A1 |    | 10/2011 |
| NL | 2004466     |    | 10/2011 |

* cited by examiner

*Primary Examiner* — Melanie Torres Williams
(74) *Attorney, Agent, or Firm* — The Webb Law Firm

(57) ABSTRACT

Disclosed is a device for blocking a vehicle, a method making use of such a device and a loading-unloading station provided therewith. The device includes a guide track disposed along a driveway, a blocking component for blocking a wheel of the vehicle, and height-adjusting component for height adjustment of the guide track and/or the blocking component during use. The device preferably includes an anti-roll mode, wherein the blocking component engages at a first height, and a locking mode, wherein the blocking component engages at a second, greater height.

12 Claims, 6 Drawing Sheets

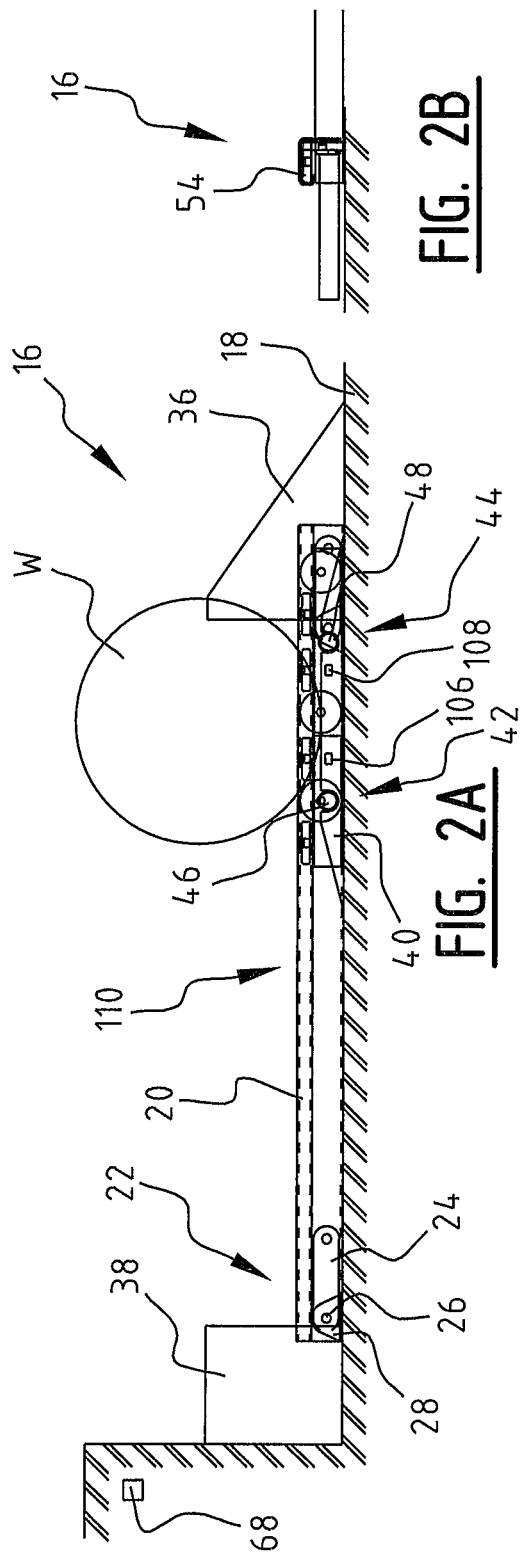
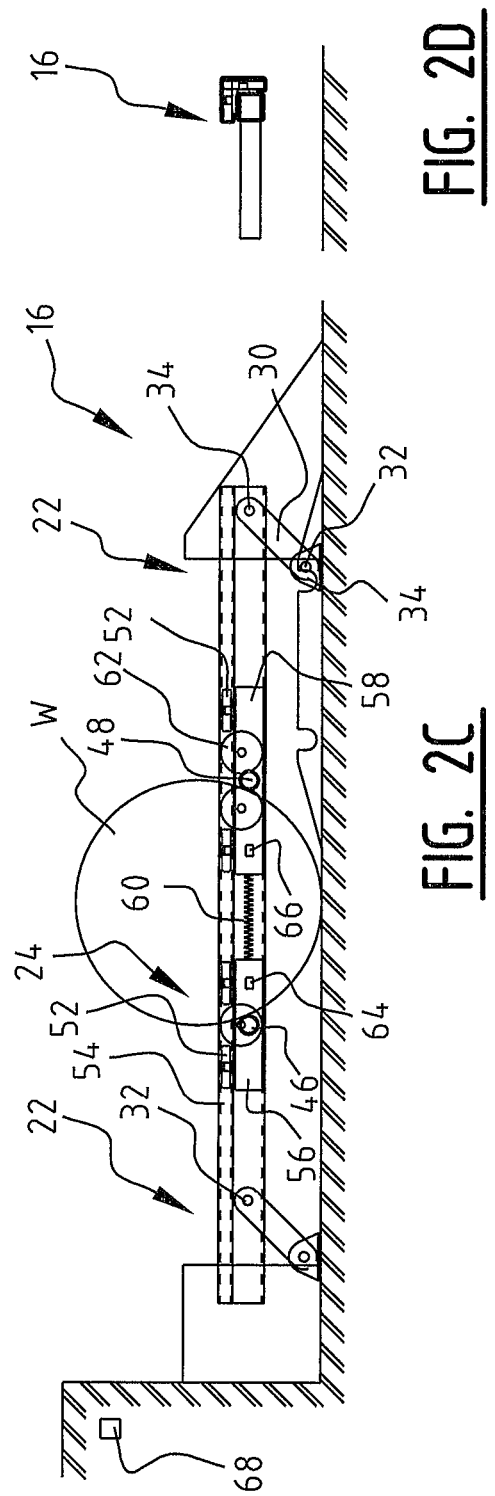

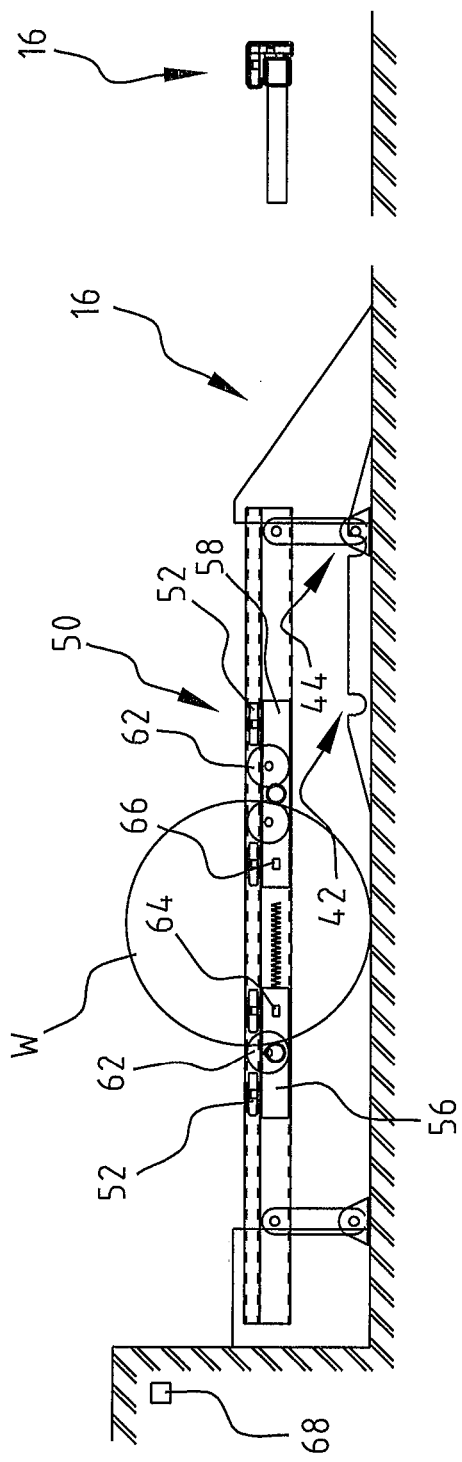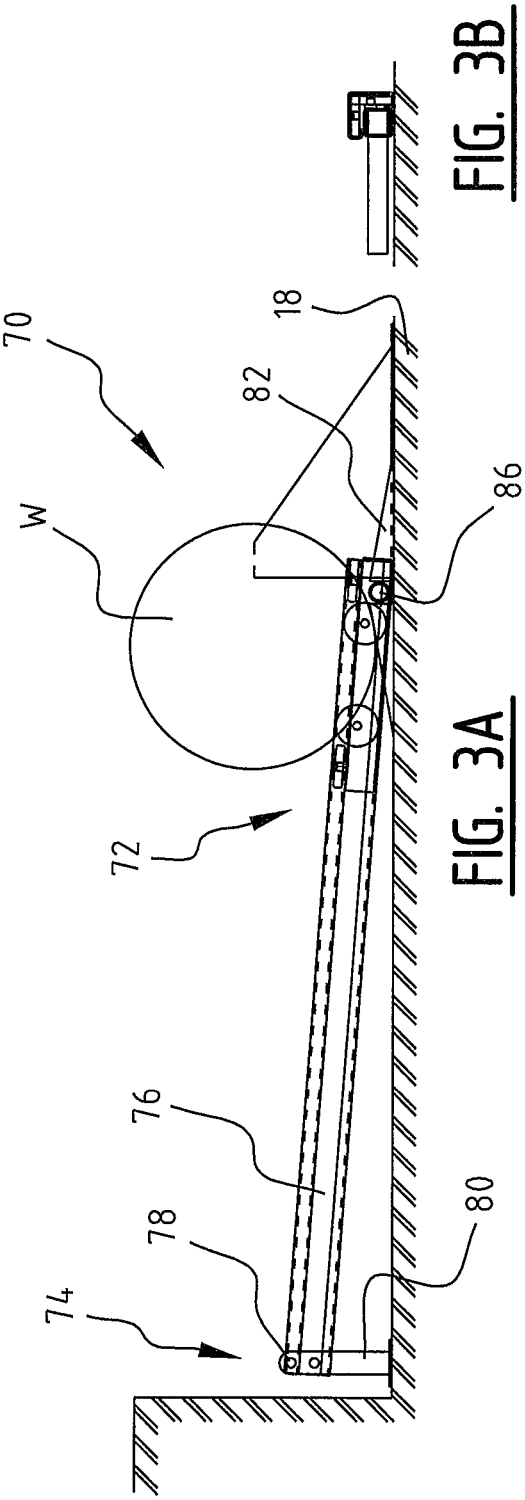

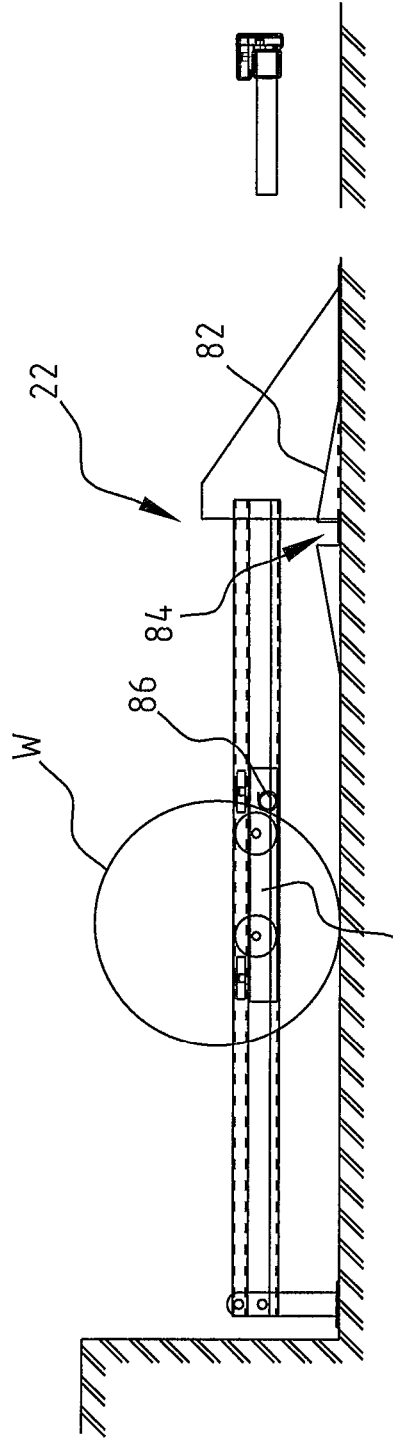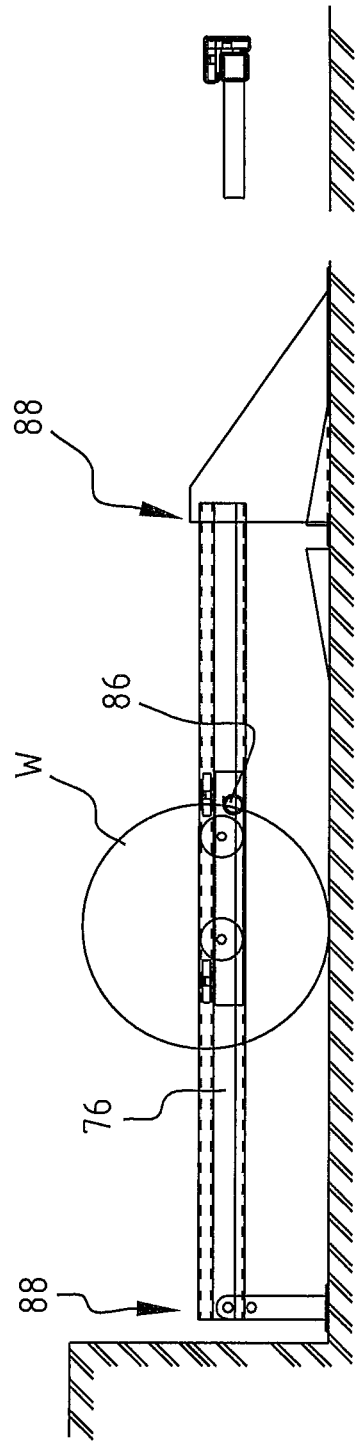

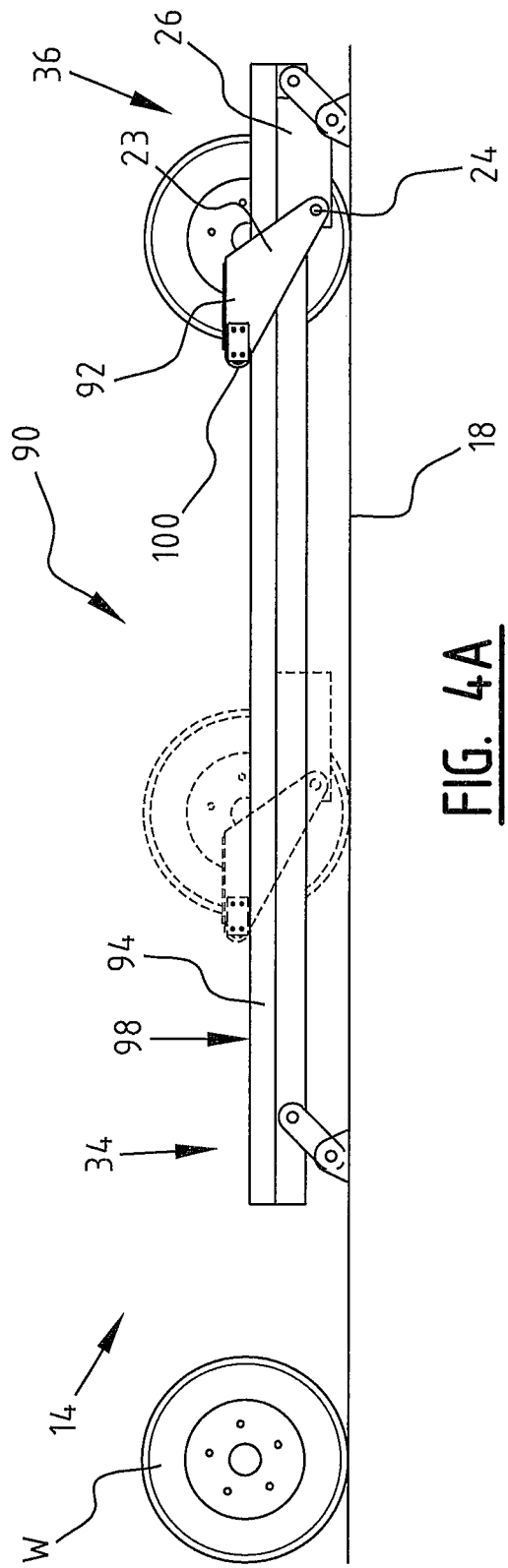
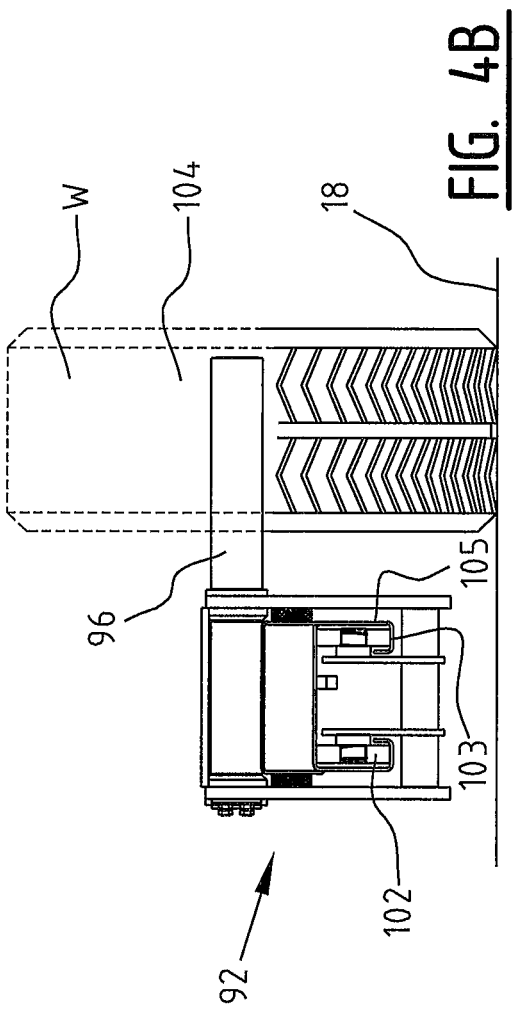
FIG. 4A
FIG. 4B

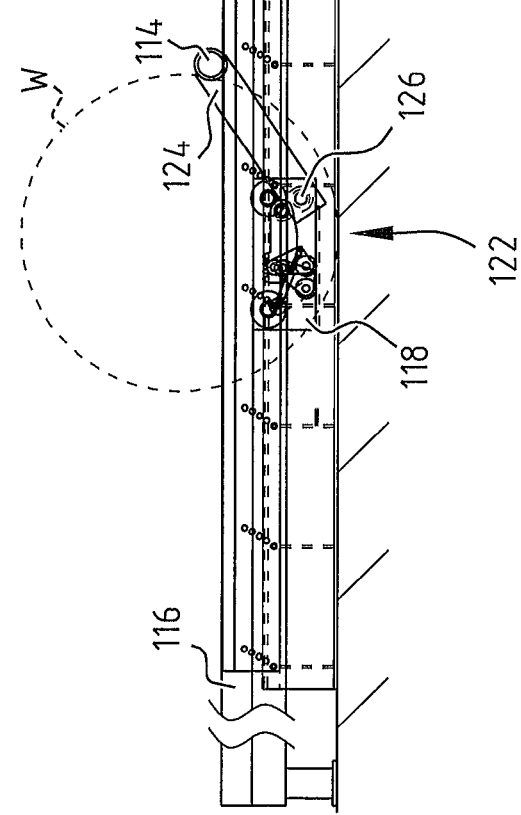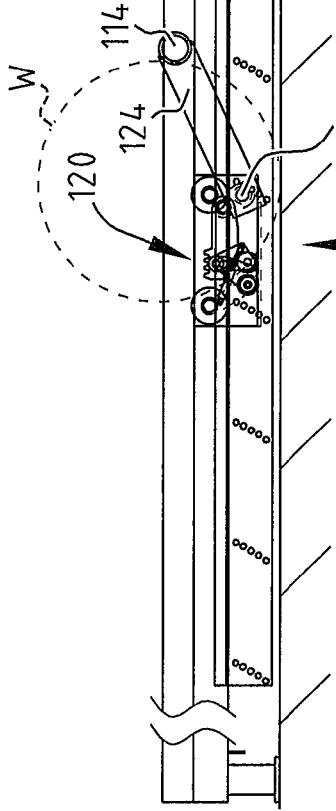

DEVICE FOR BLOCKING A VEHICLE, METHOD THEREFOR AND LOADING-UNLOADING STATION PROVIDED THEREWITH

CROSS REFERENCE TO RELATED APPLICATION

This application claims the benefit of Netherlands Patent Application No. 2009050 entitled "Device for Blocking a Vehicle, Method Therefore and Loading-Unloading Station Provided Therewith" filed Jun. 21, 2012, which is hereby incorporated by reference in its entirety.

BACKGROUND OF THE INVENTION

1. Field of the Invention

The present invention relates to a device for blocking a vehicle such as a truck. Such devices are generally used in practice to block a truck during loading and unloading thereof, for instance at a loading-unloading station of a distribution centre.

2. Description of Related Art

Devices for blocking trucks are per se known and are for instance described in EP 1 120 371 and EP 0 684 915. The blocking device known herefrom makes use of a drive to displace a carriage over a guide track. As soon as the truck is positioned correctly relative to the loading-unloading station a blocking means is extended and/or displaced in order to hold the rear wheel of the truck therewith and make driving or rolling away impossible. Such blocking devices are relatively complex due to the number of parts required, and particularly the drives required.

A blocking device is also known from NL 2004466. The blocking device known herefrom makes use of displacing means to displace a carriage from a first rest position to a second blocking position, wherein use is made of an energy storage system such that energy produced by the first vehicle as it drives away can be used to displace the carriage for a second vehicle.

A problem occurring in practice with blocking devices is the great variation in vehicles which can occur. Different vehicles have different wheel diameters. The blocking device does not therefore operate optimally for all vehicles, whereby locations provided with a blocking device, such as at a distribution centre, cannot be employed with full flexibility for all types of vehicle.

SUMMARY OF THE INVENTION

The present invention has for its object to obviate or at least reduce the above stated problems with blocking devices.

The present invention provides for this purpose a device for blocking a vehicle, comprising
  a guide track disposed along a driveway;
  a blocking means for blocking a wheel of the vehicle; and
  height-adjusting means for height adjustment of the guide track and/or the blocking means during use.

A guide track according to the invention is for instance disposed along a driveway of a loading-unloading station of for instance a distribution center. A truck is reverse parked along the guide track for the purpose of loading and unloading.

In the blocking position the blocking means, which in a currently preferred embodiment is provided on the carriage guided by the guide track, preferably engages on the rear wheel of a vehicle which is moving backwards relative to the device. Alternatively, the blocking means is for instance provided directly on the guide track.

The blocking means preferably takes the form of a type of rod extending substantially in a direction away from the longitudinal direction of the guide track such that no rotating or folding movement need be performed in order to carry the blocking means to the activated and blocking position in which the vehicle is held fast.

Further provided according to the invention are height-adjusting means with which the guide track can be adjusted in the height during use. Height adjustment of the guide track results in the guide track, and the blocking means directly or indirectly connected thereto, being adjusted in the height relative to the ground surface, and thereby relative to the vehicle. Alternatively or additionally, the height-adjusting means can also directly adjust the blocking means in the height. Use can for instance be made here of a substantially vertical and/or rotation movement of the blocking means relative to the for instance fixedly disposed guide track.

The blocking means can for instance be brought to the correct height in hydraulic manner by the height-adjusting means. In such an embodiment the guide track can if desired be disposed fixedly. It would in principle be possible in such an embodiment to optionally dispense with a guide track, although this will result in drawbacks in respect of positioning the vehicle and/or blocking means. Alternatively or additionally, a guide track can be provided in height-adjustable manner with an adjustability over a determined range in continuous or discontinuous manner (for instance using bolts and a predetermined pattern of holes).

By providing height-adjusting means the blocking means can engage at a desired height on the wheel of the vehicle. The height-adjusting means are adapted here to the vehicle for blocking. This can be performed manually by a driver and/or a location manager, for instance an employee of the distribution center, as well as automatically. The engaging height of the blocking means on the wheel of the vehicle for blocking is hereby adapted to the type of vehicle. This increases the possible uses of the device according to the invention. It is also possible to adapt the actual engaging height of the blocking means to the blocking requirement, for instance a relatively low engaging height in order to prevent the vehicle rolling away during loading and/or unloading, and for instance a relatively high engaging height in order to prevent unauthorized driving away with the vehicle during parking of the vehicle. This enhances the applicability and the possible uses of the device according to the invention.

In a currently preferred embodiment the device is provided with a carriage which is displaceable relative to the guide track such that the carriage can follow a moving truck. Preferably provided on the carriage is a locking member with which the carriage can be releasably locked relative to the guide track. The locking member preferably engages directly on the guide track. It is however also possible for the locking member to engage on for instance a ground surface on which the guide track is placed. The carriage is in this way also locked relative to the guide track. Using the displacing means the carriage can be moved from a first rest position, in which blocking of the vehicle is realized, to a second blocking position in which it is possible, following locking of the carriage relative to the guide track, to block the vehicle such that it is held stationary at the desired position. The displacing means further enable a reverse movement of the carriage after unlocking from the second blocking position such that the carriage returns to the first rest position. The vehicle can leave said position by being driven away from the blocking device.

In a preferred embodiment the locking can be realized immediately after the vehicle has come to a standstill by having the carriage co-displace with the tire of the vehicle.

The height-adjusting means preferably engage directly or indirectly at least at one position on the guide track and/or the blocking means.

When the height-adjusting means engage directly on the blocking means, it is for instance possible to adjust a blocking means displaceable along the guide track in the height relative to the guide track using the height-adjusting means. A height-adjustable blocking means can hereby be provided at the desired position.

If the height-adjusting means engage at one position on the guide track, the guide track can be placed at an adjustable angle relative to the ground surface when the height-adjusting means engage on or close to an outer end of the guide track. An alternative and/or additional embodiment is likewise possible wherein the height-adjusting means engage at one position on the guide track and the guide track as a whole is adjusted in the height using additional guides, for instance by displacing the guide track as a whole in the height. If the guide track is adjustable at an angle, the height of the blocking means can likewise be adapted to the wheel of the vehicle to be blocked. In a possible embodiment one outer end of the guide track is provided rotatably around a fastening point and height-adjusting means engage on the other outer end.

In an advantageous preferred embodiment according to the present invention the height-adjusting means engage directly or indirectly at a second position on the guide track.

Having the height-adjusting means engage at a second position on the guide track achieves that the whole guide track is adjustable in the height in controllable manner relative to the ground surface. A matching relation between a blocking means and the wheel to be blocked of the vehicle for blocking can hereby be achieved in accurate manner.

In an advantageous preferred embodiment according to the present invention the device is provided with height-adjustable coupling means for fixing or holding the guide track at a desired height.

Providing coupling means enables the guide track to be positioned at a nominal working height. These coupling means are for instance embodied as a bolt connection to an upright to which the guide track can be attached at a number of adjustable nominal fixed positions. This has the advantage that the nominal guide track height is adjustable subject to the anticipated category of vehicles, for instance delivery vans or trucks. Variation within these categories of vehicle can also be taken into account by applying the height-adjusting means according to the invention. When after a period of time a different category of vehicle has to be blocked, the nominal working height can be modified using the coupling means. This further increases the flexibility of the device according to the present invention.

In an advantageous preferred embodiment according to the present invention the device comprises an anti-roll mode, wherein the blocking means engages at a first height, and a locking mode wherein the blocking means engages at a second, greater height.

Providing a first rolling locking mode and a second locking mode enables the blocking means, depending on the situation, to engage at the optimum height. It has been found that during loading and unloading of a vehicle a blocking has the main purpose of preventing the vehicle from rolling away. For this purpose the blocking means has to engage on the wheel for blocking at a height of preferably at least 35% of the wheel diameter. If a vehicle is parked at the position for a longer period, for instance overnight, it is additionally desirable to prevent undesired movement of the vehicle, i.e. it is locked. The blocking means must here engage high on the wheel, preferably at least at 45% of the wheel diameter. It has been found that at this greater height it is no longer possible to displace the vehicle as it were over the blocking means. The selection of the setting for the anti-roll mode or the locking mode can be made by the driver of the vehicle and/or the employee of the loading-unloading station where the device is positioned, or in a more automatic manner wherein the setting is for instance made dependent on the use of the loading-unloading station. A coupling is present for this purpose between the control of the loading-unloading station on the one hand and the blocking device on the other. The use of at least two different adjustable heights achieves that the blocking can be made dependent on the wishes of the users. Engagement at a lower height as anti-rolling has the advantage that it can be performed relatively easily and quickly, wherein the attendant risk of damage is reduced. For locking purposes, for instance overnight, a greater height has to be employed so that there is actual locking. A careful positioning can be carried out for this purpose. The overall effectiveness of blocking means according to the invention is hereby increased.

In a further advantageous preferred embodiment according to the present invention the device comprises a detector for detecting the required engaging height of the blocking means.

Providing a detector allows the setting of the height-adjusting means to be performed in automatic or semiautomatic manner. This reduces the chance of mistakes.

In a currently preferred embodiment the detector comprises determining means which are provided with at least a first contact means on a first side of the wheel and a second contact means on the other side of the wheel as seen in the travel direction thereof during use of the device. These contact means are for instance embodied as rollers engaging on the tread surface of the wheel. By determining the mutual distance between the at least two contact means while they are in contact with the wheel, and also the height of the contact means relative to the ground surface over which the wheel moves, it is possible to determine the diameter of the wheel for blocking. On the basis of the wheel height, and preferably in combination with the selection between the possible modes, including the locking mode and the anti-roll mode, the detector is hereby able to determine the required effective engaging height for the blocking means. A user-friendly device can in this way be realized according to the invention. In addition, an effective blocking means is realized through the use of the detector, wherein there is no loss of time waiting for a setting, since the detector is preferably operative during positioning of the vehicle relative to the guide track.

In a further advantageous preferred embodiment according to the present invention the blocking means is provided on a displaceable carriage guided by the guide track.

A flexible positioning of the blocking means relative to the vehicle is possible due to the use of the above discussed carriage. This makes use in practice a good deal easier. The carriage can be driven in various ways, including making use of a flexible member, such as a steel cable, and other similar ways as described in NL 2004466. The blocking device according to the present invention preferably makes use of a locking member, likewise as according to NL 2004466.

In a further advantageous preferred embodiment according to the present invention the device comprises displacing means for displacing the carriage between a first rest position of the blocking means and a second blocking position, wherein the displacing means are provided with an energy storage system such that energy supplied by the vehicle is usable to displace the carriage.

The use of an energy storage system for a blocking device is per se known from the above cited document NL 2004466. The height-adjusting means are preferably also operatively connected to the energy storage system for the purpose of displacing the guide track in the height. Potential energy can hereby be recovered in effective manner during the downward movement of the guide track and subsequently used for a subsequent vehicle during the upward movement of the guide track. An energy-efficient device is in this way realized.

The present invention further relates to a loading-unloading station provided with a device as described above.

Such a loading-unloading station provides the same effects and advantages as described in respect of the device. In addition, the use of the height-adjusting means makes it possible to use each individual station for all categories and types of vehicle. This further increases the utility of such a station.

The present invention further also relates to a method for blocking a vehicle in a desired position, comprising of providing a device as described above.

Such a method likewise provides the same effects and advantages as described in respect of the device and/or the loading-unloading station.

BRIEF DESCRIPTION OF THE DRAWINGS

Further advantages, features and details of the invention are elucidated on the basis of preferred embodiments thereof, wherein reference is made to the accompanying drawings, in which:

FIGS. 2A-F show views of a first embodiment of the blocking device according to the invention;

FIGS. 3A-F show views of alternative embodiments according to the invention;

FIGS. 4A-B show views of a further embodiment according to the present invention; and FIGS. 5A-B and 6A-B show views of a further embodiment according to the invention.

DETAILED DESCRIPTION OF THE INVENTION

Figure 1:
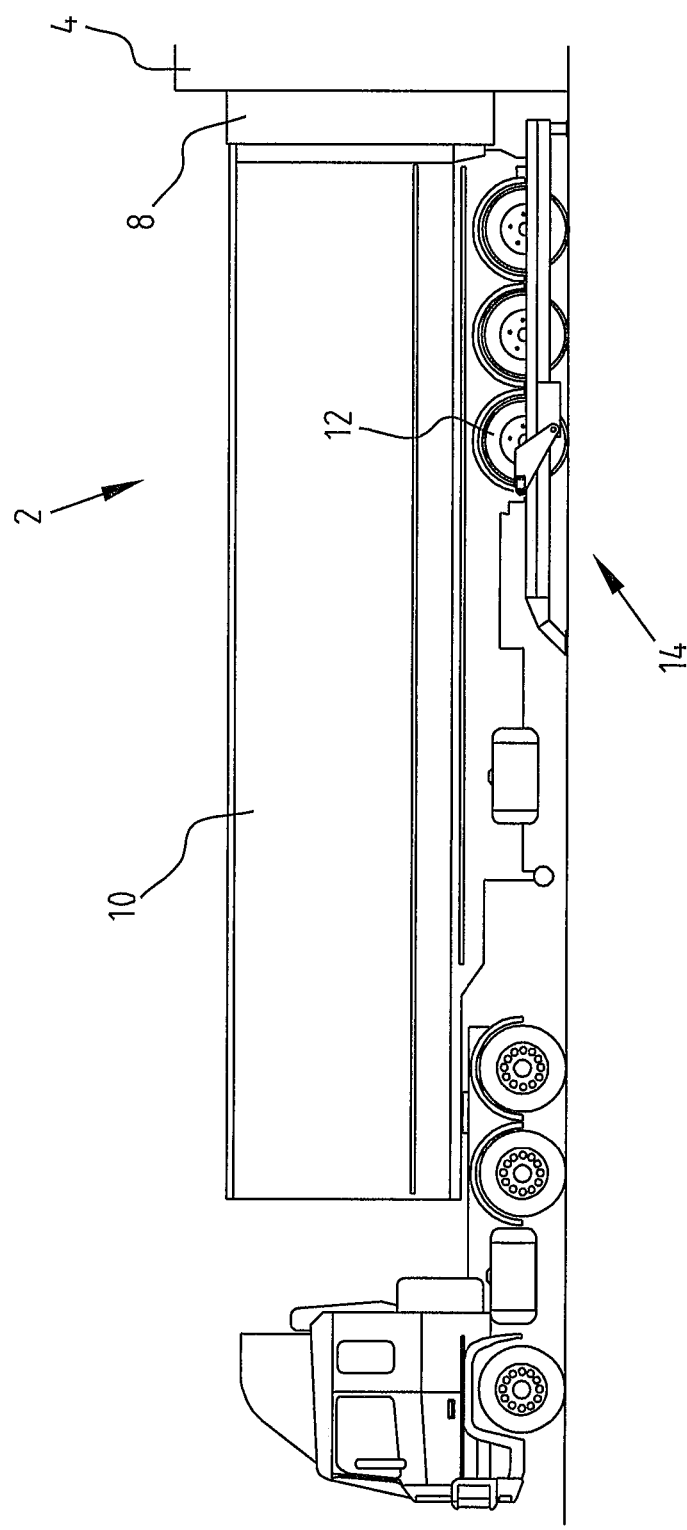
FIG. 1 shows a view of a loading-unloading station at a distribution centre.

A loading-unloading location 2 (FIG. 1) is provided at a building 4. Each loading-unloading location 2 is provided with an opening or door 6 and a so-called dock shelter 8 for protection thereof. A truck 10 is reversed to loading-unloading location 2, inter alia with rear wheels 12. Truck 10 moves here substantially parallel to blocking device 14.

A blocking device 16 (FIG. 2A-F) is placed on the ground surface 18. Device 16 is provided with guide track 20 which in the shown embodiment can be adjusted in the height relative to ground surface 18 using height-adjusting means 22. Height-adjusting means 22 comprise an arm 24, which is connected to support 28 on ground surface 18 using rotation shaft 26, and a second arm 30 which is connected to second support 34 on ground surface 18 using second rotation shaft 32. At the other outer ends the arms 24, 30 are connected via respective rotation shafts 32, 34 to guide track 20.

Provided in the shown embodiment on the front side of device 16 is an element 36 running obliquely upward and, at the other outer end of guide track 20, a second rectangular element 38 for the purpose of indicating the position of device 16. On the side where a wheel W is driven into device 16, usually in reverse, is situated a ground plate 40 in which, in the shown embodiment, two recesses 42, 44 are provided in which a first contact rod 46 and a second contact rod 48 are provided in the rest position (FIG. 2A). As soon as a wheel W reaches ground plate 40, carriage 50 with contact elements 46, 48 is uncoupled from ground plate 40 and, using wheels or rollers 52, displaced in guide 54 of guide track 20. In the shown embodiment contact means 46, 48 also form blocking means.

In the shown embodiment contact means 46, 48 are in contact on either side with wheel W during use. Contact means 46 is mounted here on sub-part 56 of carriage 50 and contact means 48 on sub-part 58 of carriage 50. In the shown embodiment sub-parts 56, 58 are mutually connected using a spring 60 so that during use contact means 46, 48 are held against the tread surface of wheel W.

In the shown embodiment rollers 62 form part of the drive and/or locking mechanism in similar manner as described in NL 2004466.

In the shown embodiment the mutual distance between sub-carriages 56, 58 and the height of contact means 46, 48 relative to ground surface 18 are determined using detectors 64, 66. The desired height adjustment can in this way be determined.

In the shown embodiment wheel W has for instance a diameter of about 1050 mm and a first anti-roll height of guide track 20 is about 350 mm and a second locking height 450 mm (FIG. 2E). The adjustment between the different heights is possible via adjusting button 68. This can otherwise be performed in fully automatic manner.

As soon as wheel W moves backwards over ground plate 40, contact means 44, 46 are released and will follow wheel W. Arms 24, 30 are simultaneously moved such that guide track 20 is carried upward from ground surface 18 as carriage 50 follows wheel W. During following the desired blocking height is determined in the shown embodiment using detectors 64, 66 and setting 68. Wheel W is then secured at the desired position.

In an alternative embodiment blocking device 70 (FIG. 3A-3F) is for the greater part provided with the same components as the above discussed blocking device 16. Only the differences will therefore be discussed below. Blocking device 70 is provided on only one side with height-adjusting means 22. Also provided is a carriage 72 which consists in this embodiment of a single part. It is noted here that blocking device 70 can likewise be provided with a carriage 50 provided with sub-part 56 and sub-part 58, while blocking device 16 (FIG. 2A-F) can also be provided with a single carriage 72 (FIG. 3A-F). It is otherwise the case that components of the shown separate embodiments are interchangeable.

Blocking device 70 is further provided with coupling means 74 wherein guide track 76 is connected at one outer end to upright 80 using rotation shaft 78. In the shown embodiment guide track 76 is in the rest position (FIG. 3A) with a first outer end placed on ground surface 18. Wheel W travels over the ground plate 82 with a recess 84 arranged therein for blocking element 86, after which blocking element 86 and carriage 72 will follow wheel W, wherein guide track 76 is simultaneously carried upward (FIG. 3C).

In the shown embodiment of device 70 guide track 76 is then further displaceable in the height (FIG. 3E) by making use of guides 88 on the outer ends of guide track 76. Guide track 76 can hereby be carried further upward, for instance from a height of about 350 mm to a height of about 450 mm.

It is optionally also possible to provide guide track 76 only with this height-displaceable option, wherein guide track 76 is displaced from ground surface 18 to the desired height, or to provide guide track 76 rotatably only at an outer end, wherein guide track 76 therefore lies at an angle to ground surface 18 in most positions of use.

In the shown embodiment blocking device 70 is embodied such that in a first nominal position (FIGS. 3C and D) guide track 76 is provided at the anti-roll height, wherein blocking element 86 prevents wheel W rolling away during for instance loading and unloading. In a locking position (FIGS. 3E and F) guide track 76 is brought to a greater height such that blocking element 86 locks wheel W against undesired driving away thereof.

A further alternative embodiment of blocking device 90 (FIG. 4A-B) is based largely on blocking device 10 (FIG. 2A-F). In the shown embodiment blocking device 90 (FIG. 4A-B) is provided with a carriage 92 enclosing guide track 94 for the greater part. Blocking element 96 blocks wheel W. Blocking device 90 is provided with guide track 94 on which a guide surface or guide rail 98 is provided over which carriage 92 is displaceable with wheels 100. Travel wheels 102 enable displacement of carriage 92 over guide track 94. Blocking element or blocking rod 96 engages on tread surface 104 of wheel W. In the shown embodiment travel wheels 102 move in bent edge 103 of side edge 105.

When a truck has to be positioned close to opening 6 of loading-unloading location 2, it will move first with rear wheel 12 over ground plate 40 in backward direction. The passage of rear wheel W is detected using sensors 106,108, (FIG. 2A), after which carriage 50 is released if blocking rod 48 is present in recess 44, and will follow this wheel 12 in the direction of opening 6.

Sensors 106,108 can be diverse types of sensor, for instance for determining the wheel diameter and/or detecting obstacles such as mudguards.

After reaching the desired loading-unloading position for truck 10, the locking and/or anti-rolling is activated in the above described manner using control button 68. Once loading and/or unloading is fully completed, the locking and/or the anti-rolling is disengaged and truck 10 can move forward along guide track 20. In the advantageous embodiment carriage 20 is pushed forward here such that telescopic springs (not shown) of the energy storage system 110 (FIG. 2A) are extended and thereby as it were tensioned. Once truck 10 has reached the front side of guide track 20, blocking rod 48 is pressed into recess 44 of ground plate 40. Energy is hereby stored in system 110 and ready for use with a subsequent truck 10. Use can also be made of telescopic springs during the change in height of guide track 20, whereby no or only minimal net external energy need be supplied for the purpose of height adjustment of guide track 20.

In a further alternative embodiment blocking device 112 (FIGS. 5A-B and 6A-B) is provided with a height-adjustable blocking rod 114 which can engage on wheel W. Guide track 116 is fixedly dispensed and carriage 118 moves substantially only in horizontal direction over guide track 116. Carriage 118 can be secured in known manner here on guide track 116 using fixation mechanism 120. Arm 124 on which blocking rod 114 is mounted is rotated around shaft 126 via mechanism 122. As a result of the rotation the rod 114 is moved in the height relative to the ground surface and the wheel W movable thereon. In the shown embodiment the height-adjustable guide 128 is co-displaced here between a high position (FIGS. 6A and 6B) and a low position (FIGS. 5A and B), wherein the height varies for instance from 425 mm to 325 mm. Other heights are also possible.

It will be apparent that diverse components of the shown embodiments are mutually interchangeable. As already discussed, carriage 20 can for instance also be applied in other embodiments. Ground plate 40 can for instance also be used in other embodiments. The optional use of the energy storage system 110 can likewise be implemented in the different embodiments. Other components can also be used here.

In the shown embodiments guide track is 20, 94 are provided over a length of about 3 to 3.5 m, and guide track 20, 94 is adjustable in the height from ground surface 18 to a height of about 500 mm thereabove. Other heights are of course also possible. Intermediate heights are likewise possible in diverse embodiments, wherein specific possibilities are provided for said anti-roll mode and locking mode.

The present invention is by no means limited to the above described preferred embodiments thereof. The rights sought are defined by the following claims, within the scope of which many modifications can be envisaged. It is noted here that diverse mechanical reversals are possible within the scope of protection of the present invention. This relates for instance to tensioning and slackening of spring 60 in blocking device 16.

The invention claimed is:

1. A device for blocking a vehicle, comprising:
   (a) a guide track disposed along a driveway;
   (b) a blocking means for blocking a wheel of the vehicle;
   (c) height-adjusting means for height adjustment of the guide track and/or the blocking means during use; and
   (d) a detector for detecting a required engaging height of the blocking means, wherein the detector comprises determining means which are provided with a first contact means positioned during use on a first side of the wheel and a second contact means positioned during use on the other side of the wheel as seen in the travel direction for the purpose of determining the mutual distance between, and the height of, the contact means.

2. The device as claimed in claim 1, wherein the height-adjusting means engage directly or indirectly at least at one position on the guide track and/or the blocking means.

3. The device as claimed in claim 2, wherein the height-adjusting means engage directly or indirectly at a second position on the guide track.

4. The device as claimed in claim 1, further comprising height-adjustable coupling means for fixing or holding the guide track at a desired height.

5. The device as claimed in claim 1, further comprising (i) an anti-roll mode, wherein the blocking means engages at a first height, and (ii) a locking mode, wherein the blocking means engages at a second, greater height.

6. The device as claimed in claim 1, wherein the blocking means is provided on a displaceable carriage guided by the guide track.

7. A device for blocking a vehicle, comprising:
   (a) a guide track disposed along a driveway;
   (b) a blocking means for blocking a wheel of the vehicle, wherein the blocking means is provided on a displaceable carriage guided by the guide track;
   (c) height-adjusting means for height adjustment of the guide track and/or the blocking means during use; and
   (d) displacing means for displacing the carriage between a first rest position of the blocking means and a second blocking position, wherein the displacing means are provided with an energy storage system such that energy supplied by the vehicle is usable to displace the carriage.

8. The device as claimed in claim 7, wherein the height-adjusting means are operatively connected to the energy storage system for the purpose of displacing the guide track in the height.

9. A loading-unloading station provided with a device as claimed in claim 1.

10. A method for blocking a vehicle in a desired position, comprising providing a device as claimed in claim 1.

11. A loading-unloading station provided with a device as claimed in claim 7.

12. A method for blocking a vehicle in a desired position, comprising providing a device as claimed in claim 7.

* * * * *